3,015,315
Patented Jan. 2, 1962

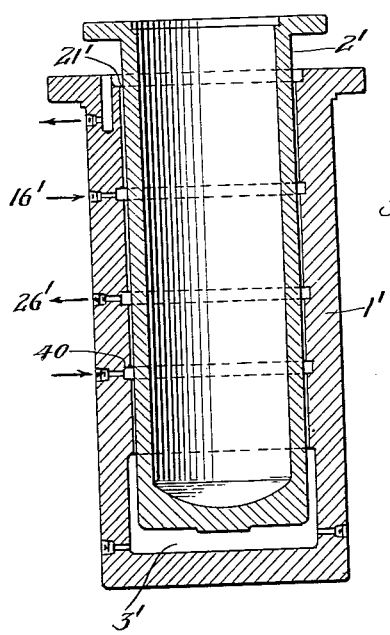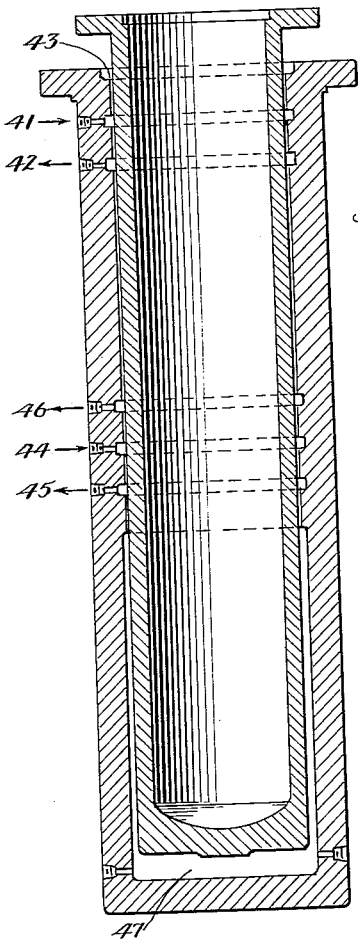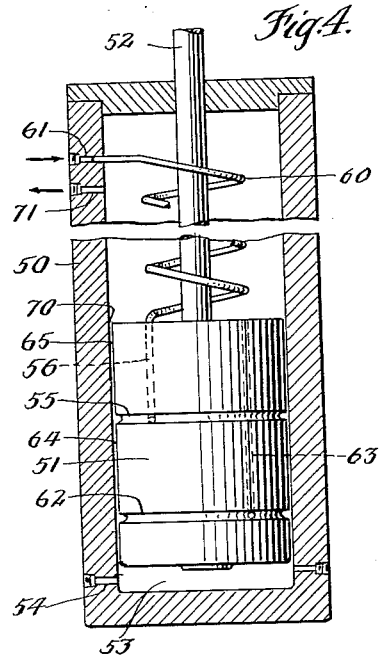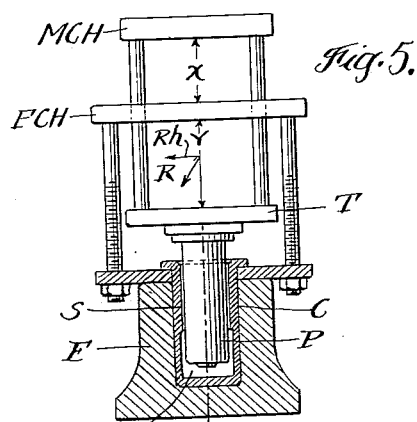

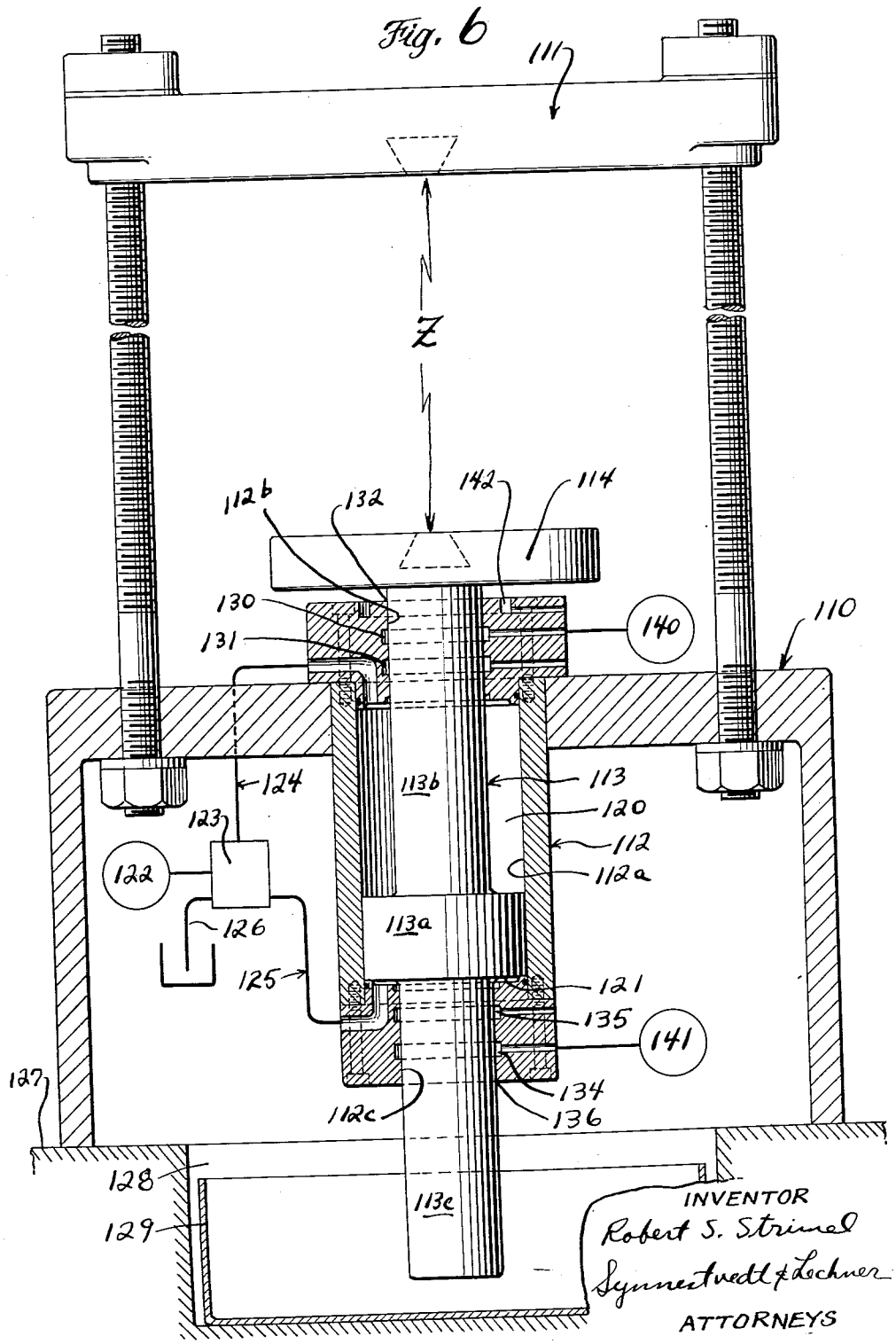

3,015,315
PISTON-CENTERING MEANS FOR HYDRAULIC
TESTING MACHINES OR THE LIKE
Robert S. Strimel, Penllyn, Pa., assignor to Tinius Olsen
Testing Machine Company, Willow Grove, Pa., a corporation of Pennsylvania
Filed Sept. 28, 1959, Ser. No. 842,828
11 Claims. (Cl. 121—46)

This invention relates in general to materials testing equipment and, in particular, relates to mechanism to eliminate or minimize friction forces between the piston and the cylinder of a hydraulic testing machine while under load.

This application is a continuation-in-part of my copending application Serial No. 541,263, filed October 18, 1955, now abandoned.

Generally speaking, a hydraulic testing machine has a loading unit adapted to stress a test specimen and a mechanical or electrical indicating unit adapted to receive information from the loading unit and indicate or record the stress being applied. The loading unit ordinarily includes a fixed crosshead and a composite movable crosshead-table arranged so that an article properly interconnected therebetween can be put under load or stressed in tension, compression, flexure or the like. The movable crosshead-table is actuated by a piston or ram operating in a fixed cylinder. The cylinder has a loading chamber adapted to be supplied with a controlled volume of fluid so as to control the piston movement in accordance with desired load. The loading chamber of the cylinder and the indicating unit have a fluid interconnection so that unit pressure in the chamber is measured and converted into terms of stress or total power for indication or recording.

In testing work with a machine of the kind in question, it is important that the piston, while moving in the cylinder to load a specimen, be kept away from the wall of the cylinder so that binding, hence, frictional forces, will not be developed. Binding on the walls of the cylinder, of course, is extremely undesirable because the frictional forces developed are additive to the reaction force of the specimen. The effect of frictional force, of course, is to proportionately increase the unit pressure in the loading chamber above that due to the specimen alone, and inasmuch as the indicating unit is responsive to absolute unit pressure, the indication includes not only the reaction of the specimen (which is the true force sought to be measured) but, in addition, includes friction force caused by binding.

When the load on the specimen is high, that is, in the range of several thousand pounds, error due to binding may not be of major importance, particularly where the unit pressure increase caused thereby is small as compared to the unit pressure developed due to the reaction of the specimen. However, in low ranges, say, in the order of several hundred pounds, the effects of binding are of major consideration because of a small differential between the binding unit pressure and the loading unit pressure. Obviously, accurate loading at small ranges is impossible unless the effects of binding are minimized or eliminated.

The principal object of this invention is to provide means for minimizing or eliminating the binding between the piston and cylinder in a hydraulic testing machine. For this object the invention contemplates means to develop fluid pressure and flow between the wall of the cylinder and the surface of the piston which, at all times, i.e., at rest or when the piston is loading a specimen, is effective to tend to center the piston on the axis of the cylinder and hence keep the same away from the walls.

The manner in which the foregoing is principally carried out will be explained in connection with the following description and drawings wherein:

FIGURE 2 is a view of another piston and cylinder embodying my invention;

FIGURE 3 is a view of another piston and cylinder embodying my invention;

FIGURE 4 is a view of another piston and cylinder embodying my invention;

FIGURE 5 is a somewhat diagrammatic view of a typical loading unit for a hydraulic-type testing machine; and FIGURE 6 is a diagrammatic view of a double acting piston and cylinder arrangement incorporating the invention.

Figure 1:
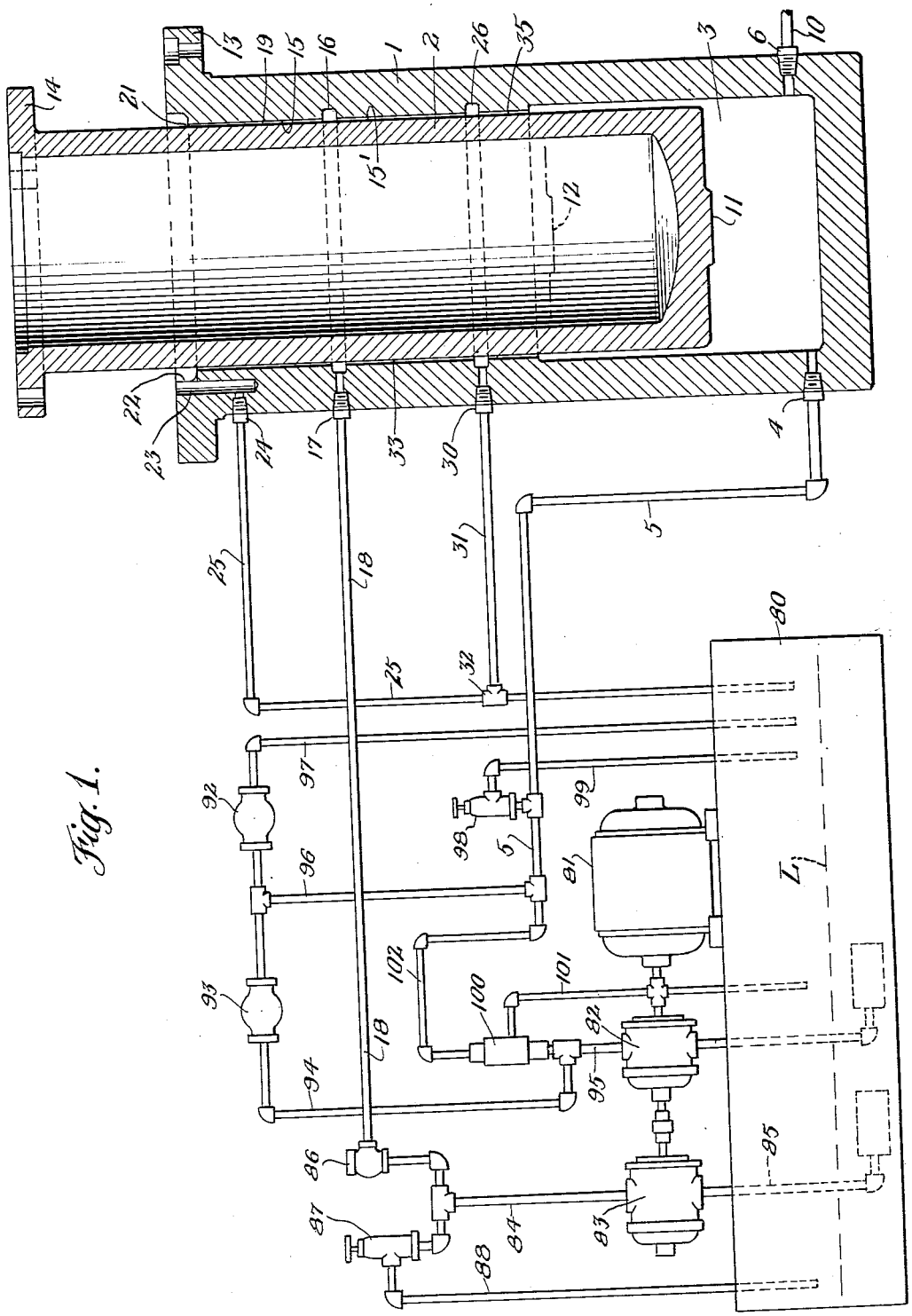
FIGURE 1 is a diagrammatic view partially in section showing a testing machine piston and cylinder provided with one embodiment of my invention together with a fluid supply system for the cylinder.

In the loading unit of FIGURE 5 the cylinder C is fixedly mounted on a frame F and interconnected to the crosshead FCH, which may be vertically adjusted to some desired fixed position with respect to the framing. The piston P disposed in the cylinder is connected to a table T and a movable crosshead MCH integral therewith. The loading chamber LC of the cylinder is adapted to be supplied with fluid in accordance with the load requirements and operates to move the piston P and table T upwardly. To cause downward movement of the table and crosshead, the chamber LC is connected to drain and the weight of the table and crossheads exhausts the fluid in the chamber. Ordinarily, no packing or gaskets are used between the piston and cylinder so that the piston in effect "floats" on a column of oil.

If a specimen is connected between the two crossheads, for example, as indicated at X, movement of the crosshead MCH causes the specimen to be stressed in tension. If a specimen is interconnected between the crosshead FCH and the table T, such as indicated at Y, movement of the table causes the specimen to be stressed in compression.

In FIGURE 5 the axis of the loading unit is designated by A, which is coaxial with the axis of the cylinder C.

One of the objectives in testing work is to arrange the specimen so that under load, the reaction forces act along the axis A. As a practical matter it is almost impossible to achieve this objective and the reaction takes place "off center" or as generally indicated by the force vector R. It will be apparent that the horizontal component Rh of the force R will tend to move the piston toward and against the wall of the cylinder (to the left as indicated in FIGURE 4). Assuming that the inside wall of the cylinder and the outside surface of the piston are finished to an ideal condition, and even that lubricating oil is present on these surfaces, the horizontal force pressing the surfaces together can cause a frictional force to be developed (acting in an axial direction and downwardly when the piston is being forced up). Furthermore, if the horizontal force is great enough, the oil film may be broken down so that there is actual metal-to-metal contact and the frictional forces developed may be very high. Thus, the upward movement of the piston is opposed by the specimen and also by the force due to friction. Since the loading chamber cannot discriminate between these two forces, the unit pressure developed is proportional to both. Inasmuch as the indicating system is driven by the absolute unit pressure in the chamber LC, it will be apparent that the indicating system indicates or records erroneously.

With the above in mind, explanation will now be made concerning the manner in which the present invention overcomes the above referred to difficulty. Stated in its simplest form, the invention provides a means to maintain flow and fluid pressure in the annular space S as between the walls of the cylinder and the surface of the piston which is effective to tend to center the piston along the axis A and keep the same away from the cylinder wall. One embodiment of the invention for accomplishing this purpose is shown in FIGURE 1 and will be explained following.

The cylinder 1 has the piston 2 disposed therein. The lower part of the cylinder has an enlarged portion which forms the loading chamber 3. Fluid to control the movement of the piston may be admitted to the loading chamber via the tap 4 connected to the line 5. The unit pressure developed in the loading chamber is adapted to be transmitted to the indicating system (not shown) of the machine via the tap 6 and the line 10.

At "no load" or "start" test position the loading chamber 3 is connected to drain and the land 11 on the piston is adapted to rest on the bottom of the cylinder. As will be apparent, the land provides a clearance so that a substantial area on the bottom of the piston is available for reaction by the fluid to initially start the upward movement of the piston. Fluid is admitted to the chamber to move the piston upwardly and the upward movement may be such that the bottom of the piston is located at a point generally indicated by the horizontal dotted lines. This point represents the full stroke of the piston or of the machine.

On the upper part of the cylinder is a flange 13, by means of which the cylinder can be secured to the framing of the machine. The piston also has a flange 14 on the upper part thereof for use in connecting the same to the table of the machine.

On the top portion of the cylinder, the inner wall or surface 15 is highly finished by precision grinding and lapping and the outside surface 15' of the piston, which faces this surface under the various positions of load, is also highly finished. The diameter of the cylinder as measured from opposite points on the surface and the inside diameter of the piston are held such that when the piston and cylinder axes are coincident, the clearance space between these elements is in the order of one thousandth or less.

On the outside wall of the cylinder is provided an annular groove 16 which is open to the piston and symmetrically disposed about the axis of the cylinder. The groove 16 is connected via tap 17 to a line 18 which, as will be explained later, is connected to a pump which forces fluid into the groove 16 upwardly (and downwardly) through the annular space 19 between the wall of the cylinder and the piston. In effect, then, the groove 16 is a fluid inlet. The oil flowing in the annular space 19 exits at the outlet 21, which is formed by the surface of the piston and the shoulder or groove 22 in the cylinder. As will be apparent, the outlet 21 is open to the piston and also symmetrical with respect to the axis of the cylinder. The shoulder 22 is in communication with a vertical bore 23 in the cylinder which is connected via tap 24 to a line 25 connected to drain or to the discharge side of the above-mentioned pump.

Also provided on the wall of the cylinder is another annular groove or outlet 26 which is spaced from the inlet 16 the same axial distance as the outlet 21. The outlet 26 is open to the piston, symmetrical with respect to the axis of the cylinder, and connected via tap 30 to a line 31 interconnected to the line 25 by the coupling 32. The fluid from the outlet 16 not only flows upwardly as mentioned above, but also flows downwardly through the space 33 between the cylinder wall and piston and thence through outlet 26 to the line 31.

The unit pressure of the fluid in flowing in the restricted passages is operative as between the wall of the cylinder and the surface of the piston and tends to center the piston along the axis of the cylinder. The unit pressure, of course, is highest at the inlet and becomes progressively lower in directions toward the outlets where it becomes zero or atmosphere.

It is preferable that the outlets be equally spaced from the inlet and at a distance so that the flow and consequent pressure acts over a substantial axial distance. For example, in a machine of the range of zero to sixty thousand pounds having a piston of approximately 8¾ inches in diameter, with a 9-inch stroke, spacing of approximately 5 inches as between the inlet and each outlet, together with a clearance space between the piston and cylinder of approximately one thousandth, gave very satisfactory results at all ranges of loading.

It is preferable that the pump supplying fluid to the inlet be of the constant volume type so that the unit pressure of the fluid in the clearance space can vary under different operating conditions.

The manner in which the above-described arrangement operates is explained following. If the axes of the piston and cylinder are coincident and the reaction of the specimen being tested is off center, the horizontal component will tend to move the piston, say, to the left as viewed in FIGURE 1. Thus, the clearance space in the left side tends to close and the unit pressure in the space tends to rise since the pump continues to force fluid through the space. The clearance space on the right-hand side tends to open; hence, the unit pressure there tends to decrease. Thus, a force is generated which acts in a direction to push the piston back toward the axis of the cylinder, in other words, a force opposite to that tending to push the piston off the axis. A fluid cushion is provided which keeps the piston and cylinder separated so that there is very little, if any, metal-to-metal contact. Hence, the frictional force is zero or very, very small.

When a specimen is under load, it is possible for fluid in the chamber 3 to flow upwardly through the space 35 into the outlet 26. This is leakage fluid. It will be understood that large leakage is undesirable because all of the fluid being pumped into the chamber 3 is not used to move the piston. This may result in some lost motion as between the movement of the piston and the fluid supplied. Also, leakage may cause a proportional drop in the unit pressure and chamber 3, hence, result in erroneous reading of the indicating unit. The leakage may be higher when the absolute loading of the specimen is high because of the high unit pressure in chamber 3. However, at higher loading the absolute unit pressure due thereto is very high as compared to the drop due to the leakage and, therefore, the error involved is negligible. At smaller loads, the leakage is lower due to the smaller unit pressure in chamber 3. In most instances in testing at lower ranges, the error due to leakage will be small enough so that it may be neglected.

Usually the leakage problem may be taken care of by the axial spacing between the chamber and the outlet 26. For example, I have found that where the unit pressure in the chamber is in the order of one thousand p.s.i., a spacing of approximately two inches between the outlet and the chamber 3 with about one thousandth clearance in the space 35 gives very satisfactory results from the standpoint of leakage.

I have found that in certain instances, however, it is preferable to provide means to seal off the fluid in chamber 3, particularly to reduce the tendency of lost motion. It is preferable that such a seal be of the hydraulic type because while packing and gaskets may be used, these are considered less desirable inasmuch as there is a tendency for swelling and binding.

A typical manner of providing a hydraulic seal is shown in FIGURE 2 where the inlet 16' and outlets 21' and 26' correspond to the inlets and outlets of FIGURE 1. Another groove 40 is provided in the cylinder 1', which is spaced from the outlet 26' and the chamber 3'. Fluid from a pump (not shown) is supplied to the inlet 40 and the fluid can flow upwardly into the space between the cylinder 1' and piston 2' to the outlet 26'. The fluid can also tend to flow in a downward direction toward the chamber 3'. The leakage fluid from the chamber 3' is blocked off by this downward flow from the inlet 40. In such an arrangement it is desirable that the fluid from the inlet 40 not flow into the chamber 3', as this may augment the fluid available in the chamber to move the piston upwardly and result in over-motion, so to speak, and also erroneous recording by the indicating unit. The above can be avoided by adjustment of the spacing between the inlet 40 and the chamber 3'. Furthermore, the pump supplying the inlet 40 can be made to supply a variable volume of fluid, depending upon the unit pressure in chamber 3', or can be cut off for small ranges and turned on for higher ranges.

The invention also contemplates that the pressure developing means be arranged in plural form, for example, in two groups as shown in FIGURE 3. In that figure, the upper part of the cylinder has an inlet 41 and two outlets 42 and 43, these being formed in a manner similar to that described in connection with FIGURE 1. On the bottom part of the cylinder is arranged inlet 44 and outlets 45 and 46, all formed by grooves in the wall of the cylinder. If desired, the inlets 41 and 44 may be connected together so as to be supplied from a common source, while the outlets are connected to the drain or to the intake side of the pump supplying the inlets. Each group of inlets and outlets operates in a manner similar to that already explained, the essential difference being that the pressure areas developed are arranged in two zones.

A seal similar to that explained in connection with FIGURE 2 may be provided between the outlet 45 and the loading chamber 47.

Another embodiment of the invention is illustrated in FIGURE 4. In this arrangement, the means for keeping the piston and cylinder apart moves with the piston and, therefore, is especially useful where the piston is to have a substantially long stroke and also where the piston and cylinder axis is to be oriented generally horizontally.

The cylinder 50 has a piston 51 disposed therein and a rod 52 mounted on the piston is adapted to be secured to the movable crosshead of a testing machine (not shown). The area 53 in the cylinder forms a loading chamber adapted to receive fluid through the port 54.

The piston has an annular groove or outlet 55 which is open to the cylinder wall and adapted to be supplied with fluid through the port 56 (cut in the piston), flexible line 60 and port 61 connected to a pump not shown. The piston has another annular groove or inlet 62 open to the cylinder wall and connected to atmosphere or reservoir through the port 63 cut in the piston.

The fluid from inlet 55 flows downwardly through the annular space 64 into the outlet 62. The fluid from the inlet also flows upwardly through the annular space 65 and exits at the outlet 70 formed by the top part of the piston and the cylinder wall.

Near the top of the cylinder is a port 71 which may be connected to reservoir or to the intake side of the pump supplying fluid to inlet 55. The fluid from the outlet 70 and from the port 63 (connected to outlet 62) flows out through the port 71. If desired, the port 71 can be connected to the intake side of a pump and a flexible line connected between the port 71 and the top of the piston so that the fluid from the outlets will be sucked up by the pump and then sent to the intake side of the pump supplying inlet 55. A fluid seal similar to that described in connection with FIGURE 2 can be provided between the chamber 53 and outlet 62.

Returning now to FIGURE 1, a typical fluid supply arrangement will be explained.

An oil reservoir or drain 80 having an oil level indicated by the dotted line L has a motor 81 mounted thereon, the motor having drive connections with the loading pump 82 and the auxiliary pump 83. The intake side of the pump 83 is submerged in fluid via the line 85. The discharge side of the pump 83 is connected via line 84, check valve 86, line 18 and tap 17 to the outlet 16. If desired, a relief valve 87 can be connected with the line 84 and set for a desired maximum unit pressure. If the pressure in the outlet 16 rises above the desired point, the relief valve will open and bypass the fluid back to reservoir via line 88.

In making a test, the release valve 92 (under control of the operator) is closed and the operating valve 93 is regulated or opened by the operator to control the supply of fluid to the chamber 3, the operating valve being connected by the lines 94 and 95 to the pump 82 and by the lines 96 and 5 to the chamber 3. After the test is completed, the release valve is opened and the chamber 3 is connected to reservoir via the line 5, line 96, release valve 92, and line 97. The weight of the piston and table, etc., causes the fluid to discharge and flow to the reservoir. If the motor 81 is operating at this time, the fluid from operating valve 93 is pumped through the release valve and through line 97 to reservoir. The relief valve 98 is provided in the line 5 to bypass the chamber 3 to reservoir via the line 99 in the event the unit pressure in the chamber rises above a desired value.

The valve 100 is arranged to bypass fluid to reservoir through line 101 in the event the operating valve 93 is closed when the pump 82 is operating. The valve 100 is also connected by line 102 to the line 5 and after the operating valve 93 is opened and/or the unit pressure in chamber 3 builds up, the pressure is effective to cause the valve 100 to cut down the volume of bypass fluid through line 101 so that fluid sufficient to maintain desired pressure flows through the line 94 and thence to the chamber 3.

It will be recalled that FIGURE 3 illustrates how the invention is arranged in plural form, particularly on a single acting piston and cylinder. In FIGURE 6 I have shown the invention in plural form as applied to a testing machine wherein the loading unit comprises a double acting piston and cylinder, the piston cooperating with a single fixed crosshead for loading a specimen in either compression or tension.

The machine has a frame 110 supporting a single fixed crosshead 111. A cylinder 112 is mounted on the frame 110 and a piston 113 is disposed in the cylinder for up and down motion. The cylinder has an enlarged center section 112a and two smaller sections 112b and 112c. The piston has corresponding enlarged and smaller portions 113a, 113b and 113c in close association with the respective walls of the cylinder sections.

The piston 113 carries the work table 114. A specimen (not shown) connected between the crosshead and the table as indicated at Z may be tested in either compression or tension depending upon the motion of the table toward or away from the crosshead.

The enlarged center portion 113a of the piston divides the cylinder section 112a into two loading chambers 120 and 121 and for moving the piston, fluid is exhausted or admitted from and to the loading chambers 120 and 121. For this purpose a pump 122 supplies fluid to a control valve 123 having a connection 124 to chamber 120 and also a connection 125 to the chamber 121. The valve 123 may be of conventional type and either manually or automatically operated to cause fluid to flow into the connection 124 and chamber 120 and out of the chamber 121 and connection 125 to drain 126, in which case the piston moves down, or the valve may cause fluid to flow into the connection 125 and chamber 121 and out of the chamber 120 and connection 124 to drain 126, in which case the piston moves up.

It will be noted that the frame 110 is mounted on the ground or floor 127 and a pit 128 accommodates the fully downward position of the piston. A drain pan 129 is disposed in the pit.

The section 112b of the cylinder has an inlet 130 and two outlets 131 and 132. The section 112c of the cylinder has an inlet 134 and outlets 135 and 136. The inlet 130 may be supplied with fluid from the pump 140 and the inlet 134 may be supplied with fluid from the pump 141 with the outlets 131, 132, 135 and 136 having connections to drain.

The two groups of inlets and outlets operate and function in a manner as explained heretofore to create two pressure zones for centering the piston. With the two pumps, the flow and pressure in the upper and lower zones may be made the same or different depending upon the circumstances and conditions of testing.

The inlets and outlets mentioned above are constructed as described heretofore. It will be noted that the outlet 132 is formed on the cylinder wall specifically by the end or top part of the cylinder and the piston wall, and the outlet 136 is formed on the cylinder wall specifically by the end or bottom part of the cylinder and the piston wall. The outlets 132 and 135 are similar in type to the outlet 70 shown in FIGURE 4. Fluid flowing out of outlet 136 drops into the drain pan 129. Fluid from the outlet 132 flows into the collector ring 142 and thence to drain.

I claim:

1. In a testing machine or the like: a cylinder having an inside wall; a piston disposed in said cylinder in close association with said wall and arranged to move along the axis of the cylinder; a first source for developing fluid pressure; a chamber formed in said cylinder connected to receive fluid from said first source to develop a force for controlling the movement of said piston; a second source for developing fluid pressure independent of said first source; fluid inlet means on said wall open to said piston and symmetrically oriented about the axis of the cylinder, the inlet means being connected to receive fluid from said second source; first fluid outlet means on said wall spaced from said inlet means and open to said piston and symmetrically oriented about the axis of the cylinder; and second fluid outlet means on said wall spaced from said inlet means at the opposite side thereof as said first inlet and open to said piston and symmetrically oriented about the axes of the cylinder and arranged to receive leakage fluid, if any, from said chamber, said second source and said inlet and outlet means cooperating to cause fluid to flow into and from said inlet along the wall of said cylinder to and through said outlets to create a fluid pressure zone as between the wall and the piston, the zone extending around the piston and for an axial length to center the piston substantially along the axis of the cylinder so as to avoid friction contact between the piston and the cylinder.

2. In a testing machine or the like: a cylinder having an inside wall; a piston disposed in said cylinder in close association with said wall and arranged to move along the axis of the cylinder; a first source for developing fluid pressure; a chamber formed in said cylinder connected to receive fluid from said first source to develop a force for controlling the movement of said piston; a second source for developing fluid pressure independent of said first source; fluid inlet means on said piston connected to receive fluid from said second source; and fluid outlet means on said piston, the inlet and outlet means being disposed and operative to create fluid flow and pressure as between said wall and said piston to center the piston substantially along the axis of the cylinder so as to avoid friction contact between the piston and the cylinder, a portion of said outlet means being arranged to receive leakage fluid, if any, from said chamber.

3. In a testing machine or the like: a cylinder having an inside wall; a piston disposed in said cylinder in close association with said wall and arranged to move along the axis of the cylinder; a first source for developing fluid pressure; a chamber formed in said cylinder connected to receive fluid from said first source to develop a force to control the movement of said piston; a second source for developing fluid pressure independent of said first source; a first groove formed on said cylinder wall and forming a fluid inlet, the groove being connected to receive fluid from said second source; a second groove formed on said cylinder wall on one side of said first groove and adjacent said chamber, the second groove forming a fluid outlet; and a third groove formed on said cylinder wall on the opposite side of said first groove, the third groove forming a second fluid outlet, said second source and said inlet and outlets cooperating to cause fluid to flow into and from said inlet along the wall of said cylinder and to and through said outlets to create a fluid pressure zone between the wall and the piston, the zone extending around the piston and for an axial length to center the piston substantially along the axis of the cylinder so as to avoid friction contact between the piston and the cylinder.

4. In a testing machine or the like: a cylinder having an inside wall; a piston disposed in said cylinder in close association with said wall and arranged to move along the axis of the cylinder; a first source of fluid pressure; a chamber formed in said cylinder connected to receive fluid from said source to develop a force for controlling the movement of said piston; a second source of fluid pressure; fluid inlet means on said wall and open to said piston and connected to receive fluid from said second source; and fluid outlet means on said wall and open to said piston and disposed on opposite sides of said inlet means, the inlet and outlet means being disposed and operative to create fluid flow and pressure as between said wall and said piston to center the piston substantially along the axis of the cylinder so as to avoid friction contact between the piston and the cylinder, a portion of said outlet means being arranged to receive leakage fluid, if any, from said chamber.

5. In a testing machine or the like: a cylinder element having an inside wall; a piston element disposed in said cylinder in close association with but spaced from said wall and arranged to move along the axis of the cylinder; a first source of fluid pressure; a chamber formed in said cylinder connected to receive fluid from said source to develop a force for controlling the movement of said piston; a second source of fluid pressure; fluid inlet means on one of said elements and open to said space between the piston and cylinder and connected to receive fluid from said second source; and fluid outlet means on one of said elements and open to said space between the piston and cylinder and disposed on opposite sides of said inlet means, the inlet and outlet means being disposed and operative to create fluid flow and pressure as between said wall and said piston to center the piston substantially along the axis of the cylinder so as to avoid friction contact between the piston and the cylinder.

6. In a testing machine or the like: a cylinder element having an inside wall; a piston element disposed in said cylinder in close association with but spaced from said wall and arranged to move along the axis of the cylinder; a first source of fluid pressure; a chamber formed in said cylinder connected to receive fluid from said source to develop a force for controlling the movement of said piston; a second source of fluid pressure; fluid inlet means on one of said elements and open to said space between the piston and cylinder and connected to receive fluid from said second source; and fluid outlet means on one of said elements and open to said space between the piston and cylinder and disposed on opposite sides of said inlet means, the inlet and outlet means being disposed and operative to create fluid flow and pressure as between said wall and said piston to center the piston substantially along the axis of the cylinder so as to avoid friction contact between the piston and the cylinder, a portion of said outlet means being arranged to receive leakage fluid, if any, from said chamber.

7. In a testing machine or the like: a cylinder having an inside wall; a piston disposed in said cylinder in close association with said wall and arranged to move along the axis of the cylinder; a first source of fluid pressure; a chamber formed in said cylinder connected to receive fluid from said source to develop a force for controlling the movement of said piston; a second source of fluid pressure; fluid inlet means on said piston and open to said cylinder and connected to receive fluid from said second source; and fluid outlet means on said piston open to said cylinder and disposed on opposite sides of said inlet means, the inlet and outlet means being disposed and operative to create fluid flow and pressure as between said wall and said piston to center the piston substantially along the axis of the cylinder so as to avoid friction contact between the piston and the cylinder, a portion of said outlet means being arranged to receive leakage fluid, if any, from said chamber.

8. In a testing machine or the like: a cylinder; a piston disposed in said cylinder and arranged to move along the axis of the cylinder; a first source of fluid pressure; a chamber formed in said cylinder connected to receive fluid from said source to develop a force for controlling the movement of said piston; a second source of fluid pressure; fluid inlet means including a groove on said cylinder connected to receive fluid from said second source; and fluid outlet means formed in part by a groove on said cylinder disposed between first said groove and said chamber to receive leakage fluid, if any, from the chamber and formed in part by the open end of the cylinder, the inlet and outlet means being operative to develop flow and pressure to create a fluid pressure zone between the cylinder and piston, the zone extending around the piston and for an axial length to center the piston substantially along the axis of the cylinder so as to avoid friction contact between the piston and cylinder.

9. In a testing machine or the like: a cylinder having an enlarged center section and two smaller sections respectively disposed on opposite sides of the center section; a piston extending through said sections and having portions respectively in close association with the walls of the sections; a source of fluid pressure; means to control fluid flow between the source and the center section of said cylinder for moving the piston alternatively in opposite directions; first fluid inlet means and first fluid outlet means on the wall of one of said smaller sections; mechanism for supplying fluid to said first inlet means; second fluid inlet means and second fluid outlet means on the other of said smaller sections; and mechanism for supplying fluid to said second inlet, the first and the second inlet and outlet means being disposed and operative to develop flow and pressure to create a fluid pressure zone extending around the piston and each zone operating for centering the piston along the axis of the cylinder so as to avoid friction contact between the piston and cylinder.

10. A construction in accordance with claim 9 wherein the outlet means on each smaller section includes a portion arranged to receive leakage fluid, if any, from said center section.

11. In a testing machine or the like: a cylinder having an enlarged center section and two smaller sections respectively disposed on opposite sides of the center section; a piston extending through said sections having portions respectively in close association with the walls of the sections; a source of fluid pressure; means to control fluid flow between the source and the center section of said cylinder for moving the piston alternatively in opposite directions; first fluid inlet means and first fluid outlet means; mechanism for supplying fluid to said inlet means, the first fluid inlet and outlet means being disposed and operative to develop first fluid flow and pressure between one of the small sections of said cylinder and the portion of said piston operating therein; second fluid inlet means and second fluid outlet means; mechanism for supplying fluid to said second fluid inlet means, the second fluid inlet and outlet means being disposed and operative to develop second fluid flow and pressure between the other of the small sections of said cylinder and the portion of said piston operating therein, said first and second fluid flow and pressure operating to center the piston substantially along the axis of the cylinder so as to avoid friction contact between the piston and cylinder.

References Cited in the file of this patent

UNITED STATES PATENTS

| | | |
|---|---|---|
| 772,842 | Spencer et al. | Oct. 18, 1904 |
| 2,367,009 | Davis | Jan. 9, 1945 |